US009232371B2

United States Patent
Zhang et al.

(10) Patent No.: US 9,232,371 B2
(45) Date of Patent: Jan. 5, 2016

(54) METHOD AND SYSTEM FOR TRANSFERRING SPEECH INFORMATION

(71) Applicant: TENCENT TECHNOLOGY (SHENZHEN) COMPANY LIMITED, Shenzhen (CN)

(72) Inventors: Bin Zhang, Shenzhen (CN); Zhenan Guan, Shenzhen (CN); Xing Liang, Shenzhen (CN); Yuewei Chen, Shenzhen (CN); Lejun Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/457,378

(22) Filed: Aug. 12, 2014

(65) Prior Publication Data

US 2014/0357235 A1    Dec. 4, 2014

Related U.S. Application Data

(63) Continuation of application No. PCT/CN2013/070696, filed on Jan. 18, 2013.

(30) Foreign Application Priority Data

Feb. 21, 2012 (CN) .......................... 2012 1 0039521

(51) Int. Cl.
*H04L 12/58* (2006.01)
*H04W 4/12* (2009.01)
(Continued)

(52) U.S. Cl.
CPC ............... *H04W 4/12* (2013.01); *G10L 25/51* (2013.01); *H04L 51/10* (2013.01); *H04M 1/7255* (2013.01);
(Continued)

(58) Field of Classification Search
CPC ......... H04W 4/12; H04W 4/16; H04M 7/006; H04M 2201/12; H04M 2201/18; H04M 1/7255; G10L 25/51
USPC ......................... 455/412.1, 414.1, 412.2, 413
See application file for complete search history.

(56) References Cited

U.S. PATENT DOCUMENTS

RE34,976 E  *  6/1995  Helferich ............... H04B 1/662
                                                                    379/88.1
2008/0285731 A1    11/2008  Mykhalchuk et al.
(Continued)

FOREIGN PATENT DOCUMENTS

CN          1917674         2/2007
CN       101026789 A        8/2007
(Continued)

OTHER PUBLICATIONS

European Search Report from Application No. 13752484.9 dated Mar. 3, 2015.
(Continued)

*Primary Examiner* — Khai M Nguyen
(74) *Attorney, Agent, or Firm* — Marshall, Gerstein & Borun LLP

(57) ABSTRACT

It relates to computer communication technology. A method and system for transmitting voice messages are disclosed. The method includes: voice data collected by the first intercom terminal are received; whether the size of the voice data collected reaches a predefined threshold are circularly detected; and when the size of the voice data collected reaches the predefined threshold, or when the voice data collected doesn't reach the predefined size but contains a voice message terminator, the voice data collected are upload to the transit server via a predefined network, to realize asynchronization between voice data collection and uploading. Thus the problem of the prolongation of the intercom data transmission time associated with existing processes is solved by such an effective intercom data transmission method. In this method, the collection and uploading of the voice data can be done asynchronously, thus the delay of intercom can be reduced and the experience of the users of intercom terminal can be improved.

13 Claims, 5 Drawing Sheets

(51) Int. Cl.
   *H04M 7/00* (2006.01)
   *G10L 25/51* (2013.01)
   *H04M 1/725* (2006.01)
   *H04M 3/533* (2006.01)
   *H04W 4/16* (2009.01)

(52) U.S. Cl.
   CPC .............. *H04M 3/533* (2013.01); *H04M 7/006* (2013.01); *H04M 2201/12* (2013.01); *H04M 2201/18* (2013.01); *H04W 4/16* (2013.01)

(56) References Cited

U.S. PATENT DOCUMENTS

2009/0161665 A1* 6/2009 Rojas ................... H04L 12/581 370/352

2010/0166159 A1* 7/2010 Katis ................... H04L 12/1822 379/88.13

FOREIGN PATENT DOCUMENTS

| CN | 101351026 A | 1/2009 |
| CN | 102281213 A | 12/2011 |
| CN | 102624874 A | 8/2012 |
| WO | WO-2009/126426 A1 | 10/2009 |

OTHER PUBLICATIONS

Chinese Office Action from Application No. 201211039521.9 dated Aug. 14, 2013.
International Search Report in PCT/CN2013/070696 dated Apr. 18, 2013.

* cited by examiner

METHOD AND SYSTEM FOR TRANSFERRING SPEECH INFORMATION

CROSS REFERENCE

This application is a continuation of an International application No. PCT/CN2013/070696, filed on Jan. 18, 2013, which claims the benefit of Chinese Patent Application No. 201210039521.9, filed on Feb. 21, 2012, the disclosure of which is incorporated herein in its entirety by reference.

TECHNICAL FIELD

The present disclosure relates to computer communication technology, and more particularly, to a method and system for transmitting voice messages.

BACKGROUND

The network-based voice intercom is a network-based message transmission application and it can simulate the behavior of short message service to provide a new interaction mode for network users.

However, in the existing processes, an intercom terminal of a sender (e.g., mobile terminal) records a voice message when it receives a user intercom command (e.g., an instruction triggered by touching), and then, the voice message is uploaded to a server, finally an intercom terminal of a recipient can download the voice message from the server and play it. As can be seen, the intercom terminal of the recipient has to wait to download the voice message until after the intercom terminal of the sender has completed the upload of the complete voice message of one time of intercom. This takes additional time for the transmission of intercom voice messages, leading to a reduction in the intercom experience of users.

SUMMARY

The present disclosure provides a method and system for transmitting voice messages, seeking to address the problem of the prolongation of the intercom data transmission time associated with the existing processes.

An embodiment of the present disclosure provides a method for transmitting voice messages. The method includes the following steps:

receiving voice data collected by a first intercom terminal;

detecting whether the size of the voice data collected reaches a predefined threshold;

uploading the voice data collected to a transit server via a predefined network on condition that the size of the voice data collected reaches the predefined threshold or when the voice data collected contains a voice message terminator.

Another embodiment of the present disclosure is to provide a system for transmitting voice messages. The system includes:

a data collection unit, configured to receive voice data collected by a first intercom terminal;

a cycle detection unit, configured to detect whether the size of the voice data collected reaches a predefined threshold; and a data uploading unit, configured to upload the voice data collected to a transit server via a predefined network when the size of the voice data collected reaches the predefined threshold or when the voice data collected contains a voice message terminator.

Another embodiment of the present disclosure further provides a computer storage medium for storing computer executable programs. The computer executable programs are used to execute a method for transmitting voice messages according to an embodiment of the present disclosure.

The embodiments of the present disclosure can realize asynchronization between the collection of voice data by the first intercom terminal and the uploading of the voice data collected of predefined size to the transit server, thereby solving the problem of time consuming during the traditional voice message transmissions, reducing the intercom delay and improving the personalization of intercom in such manner that the voice data collected by the first intercom terminal is received and circularly detected to determine whether the size of the voice data collected reaches the predefined threshold and then the voice data collected are uploaded to the transit server via the predefined network when the size of the voice data collected reaches the predefined threshold or when the voice data collected doesn't reach the predefined size but contains a voice message terminator.

BRIEF DESCRIPTION OF THE DRAWINGS

The aforementioned technical solution in the embodiments of the present disclosure can be better understood by reading the literal explanation of the disclosure with reference to the drawings. The accompanying drawings used in description of the embodiments are introduced briefly below. Obviously, the accompanying drawings in the description are only some of the embodiments of the disclosure. Those skilled in the art can obtain other accompanying drawings based on the accompanying drawings below without any creative work.

DETAILED DESCRIPTION OF THE DISCLOSURE

In order to better clarify the objectives, technical solution and advantages of the present disclosure, detailed description is given below on embodiments of the present disclosure in conjunction with the accompanying drawings. Although the disclosure has been described in connection with specific preferred embodiments, it should be understood that the disclosure as claimed should not be unduly limited to such specific embodiments The implementation of the present disclosure will be described in detail in conjunction with specific embodiments as follows:

Embodiment 1

The increase in the transmission speed of data between mobile terminals data and the reduction in the transmission cost per unit data volume provide favorable conditions for the network-based voice intercom which realizes voice intercom through using the network flow and simulating the behavior of the traditional short message service (SMS).

Figure 1:
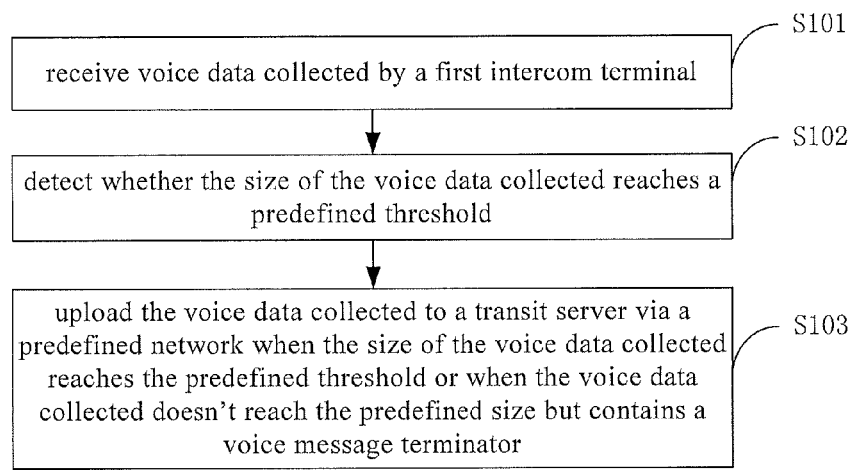
FIG. 1 is a flowchart of a method for transmitting voice messages according to embodiment 1 of the present disclosure.

FIG. 1 illustrates a flowchart of a method for transmitting voice messages transmission method according to embodiment 1 of the present disclosure, as described below in detail:

In step S101, receive voice data collected by a first intercom terminal.

In step S102, detect circularly whether the size of the voice data collected reaches a predefined threshold.

In this embodiment of the present disclosure, when the intercom command is received from a user, the first intercom terminal starts to collect the user's voice data until the end of this intercom. As a result, the complete voice message of the user of the first intercom terminal in one time of intercom has been obtained, which includes a number of voice data (data packages). In practical implementation, the intercom command may be generated by such a triggering event as specific voice, pressing on a physical key of intercom terminal or virtual key and so on.

In step S103, upload the voice data collected to a transit server via a predefined network when the size of the voice data collected reaches the predefined threshold or when the voice data collected doesn't reach the predefined size but contains a voice message terminator.

In this embodiment of the present disclosure, a value is predefined as the threshold for the voice data encapsulation and the size of data to be uploaded, and whether the size of the voice data collected reaches the predefined threshold is circularly detected. Once the predefined threshold is reached, or when the size of the voice data collected doesn't reach the predefined threshold but the voice data collected contains a voice message terminator, the data will be encapsulated according to the transmission protocol or format of the predefined network transmission and uploaded to the transit server, thereby realizing the asynchronization between collection and uploading of the voice data and reducing the intercom delay.

In practical implementation, the predefined threshold may be either a fixed value or the value which is a function of intercom time. The definition of such threshold shall take the voice data sending network used by the intercom terminal, the data processing capability of the intercom terminal and the user's demand for the real-time intercom into comprehensive consideration. For instances, if the voice data sending network is fast and the intercom terminal has a high data processing capability, this threshold may be set to a smaller value, and if not, it shall be set to a larger one; if the user has a high demand for the real-time intercom and the intercom terminal has a high data processing capability, this threshold may be set to a smaller value, and if not, it shall be set to a larger one. Therefore, the fact that the threshold shall be set according to particular application environment is not intended to limit the scope of the present disclosure.

In practical implementation, when the size of the voice data collected doesn't reach the predefined threshold but the user of the first intercom terminal has sent the signal to end this intercom, namely, the voice data collected contains a voice message terminator, the voice data collected of actual size will be immediately uploaded. To be exact, the predefined network may be either a wireless network, such as WiFi network or GPRS network, or a wired network. But herein it is not intended to limit the scope of the present disclosure.

The present embodiment of the disclosure has realized the asynchronization between the collection of voice data by the first intercom terminal and the uploading of the voice data collected of predefined size to the transit server and thereby solved the problem of time consuming with the traditional voice message transmission, reduced the intercom delay and improved the personalization of intercom, through receiving the voice data collected by the first intercom terminal, circularly detecting whether the size of the voice data collected reaches the predefined threshold and then uploading the voice data collected to the transit server via the predefined network when the size of the voice data collected reaches the predefined threshold or when the voice data collected doesn't reach the predefined size but contains a voice message terminator.

Embodiment 2

Figure 2:
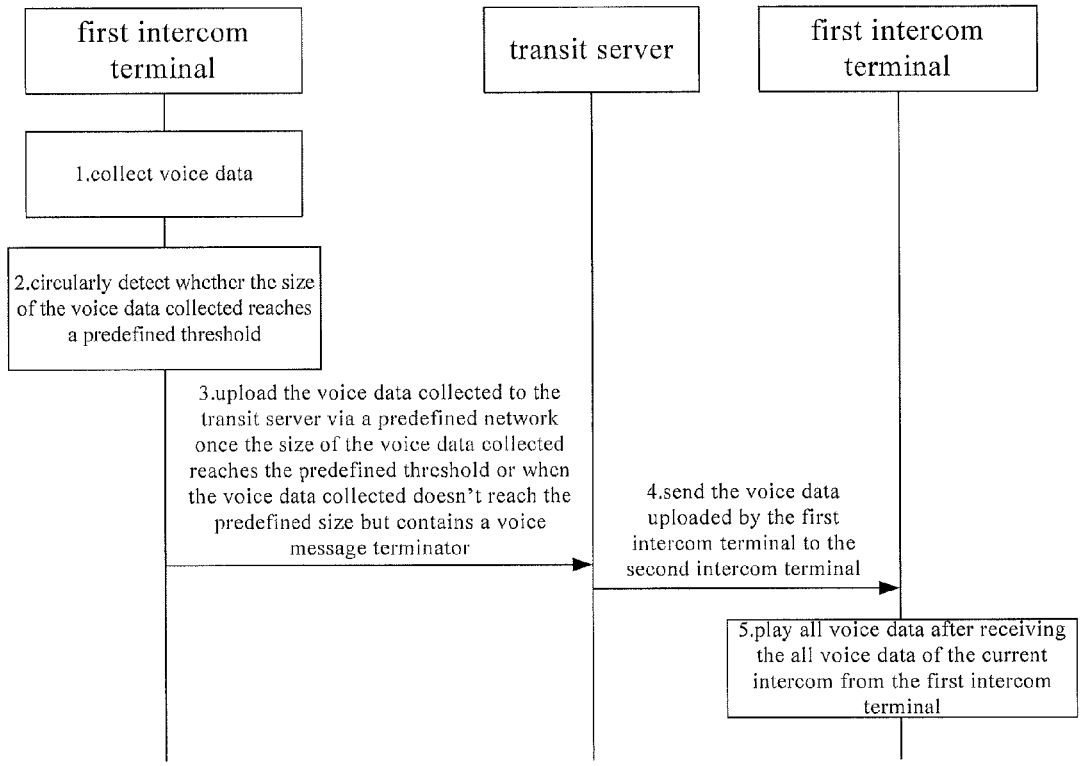
FIG. 2 is a flowchart of asynchronous transmission of voice data between a first intercom terminal and a second intercom terminal according to embodiment 2 of the present disclosure.

FIG. 2 illustrates a flowchart of the asynchronous transmission of voice data between a first intercom terminal and a second intercom terminal in another embodiment of the present disclosure. In the implementation of the present disclosure as described below, the whole intercom system includes the first intercom terminal, the transit server and the second intercom terminal:

In step 1: the first intercom terminal collects voice data.

In step 2: the first intercom terminal circularly detects whether the size of the voice data collected reaches a predefined threshold.

In step 3: the first intercom terminal uploads the voice data collected to the transit server via a predefined network once the size of the voice data collected reaches the predefined threshold or when the voice data collected doesn't reach the predefined size but contains a voice message terminator.

In this embodiment of the present disclosure, steps 1-3 resemble Steps S101-S103 in embodiment 1, and no more description is given here.

In step 4: the transit server sends the voice data uploaded by the first intercom terminal to the second intercom terminal.

In this embodiment of the present disclosure, the second intercom terminal is the receiving terminal. After the transit server receives the voice data uploaded by the first intercom terminal, it asynchronously sends the received voice data to the second intercom terminal, making it possible for the second intercom terminal to receive the voice data collected in real time, without the need to wait for the arrival of all voice messages in one time of intercom at the transit server, and thereby reducing the time used by the second intercom terminal to receive data.

In step 5: the second intercom terminal plays all voice data after receiving the all voice data of the current intercom from the first intercom terminal.

In this embodiment of the present disclosure, a value is predefined as the threshold for the voice data encapsulation and the size of data to be uploaded, and whether the size of the voice data collected reaches the predefined threshold is circularly detected. Once the predefined threshold is reached, or when the size of the voice data collected doesn't reach the predefined threshold but it contains a voice message terminator, the data will be encapsulated according to the transmission protocol or format of the predefined network transmission, and while continuing to collect data, the voice data collected of predefined size will be uploaded to the transit server, realizing the asynchronization between data collection and uploading and reducing the intercom delay. Correspondingly, the second intercom terminal can also download the voice data in a timely manner from the transit server or timely receive the voice data transferred by the transit server, reducing the time used by the second intercom terminal for downloading/receiving data. After receiving all voice data in the current intercom from the first intercom terminal, the second intercom terminal plays all the voice data in this time of the current intercom, eventually realizing the network-based intercom and reducing the data transmission time in this time of intercom.

Embodiment 3

Figure 3:
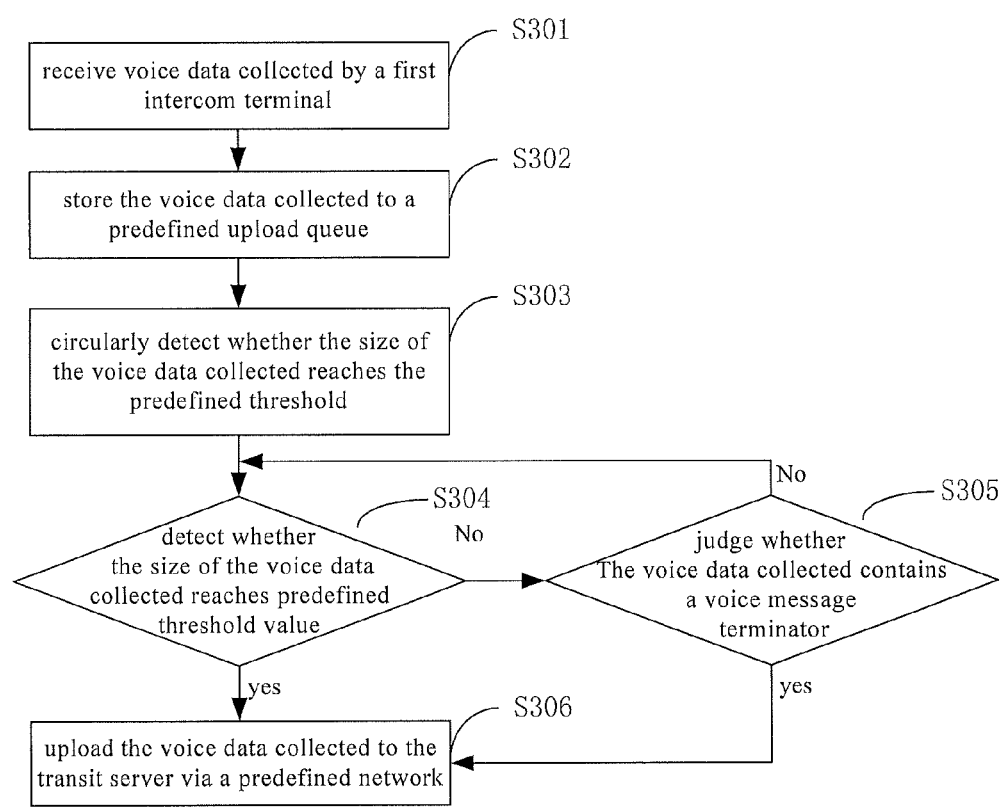
FIG. 3 is a flowchart of a method for transmitting voice messages according to embodiment 3 of the present disclosure.

FIG. 3 illustrates a flowchart of a method for transmitting voice messages according to embodiment 3 of the present disclosure. This embodiment is described in detail as below:

In step S301, receive voice data collected by a first intercom terminal.

In step S302, store the voice data collected to a predefined upload queue.

Preferably, in this embodiment of the present disclosure, an upload queue is predefined, for caching the voice data collected to be uploaded to the transit server.

In step S303, circularly detect whether the size of the voice data collected reaches the predefined threshold.

In step S304, detect whether the size of the voice data collected reaches predefined threshold value, and if yes, go to step S306, or if not, go to step S305.

In step S305, judge whether the voice data collected contains a voice message terminator, and if yes, go to step S306, or if not, go to step S304.

In step S306, upload the voice data collected to the transit server via a predefined network.

In this embodiment of the present disclosure, the size of the upload queue in step S302 may be set to an integral multiple of the predefined threshold, for conveniently storing the voice data collected. When the size of the voice data collected reaches the predefined threshold or when the voice data collected doesn't reach the predefined size but contains a voice message terminator, the voice data collected will be uploaded to the transit server via the predefined network. In case the size of the voice data collected reaches the predefined threshold but the voice data can't be sent out in a timely manner, it can be cached in the upload queue, so as to avoid the loss of voice data.

Embodiment 4

Figure 4:
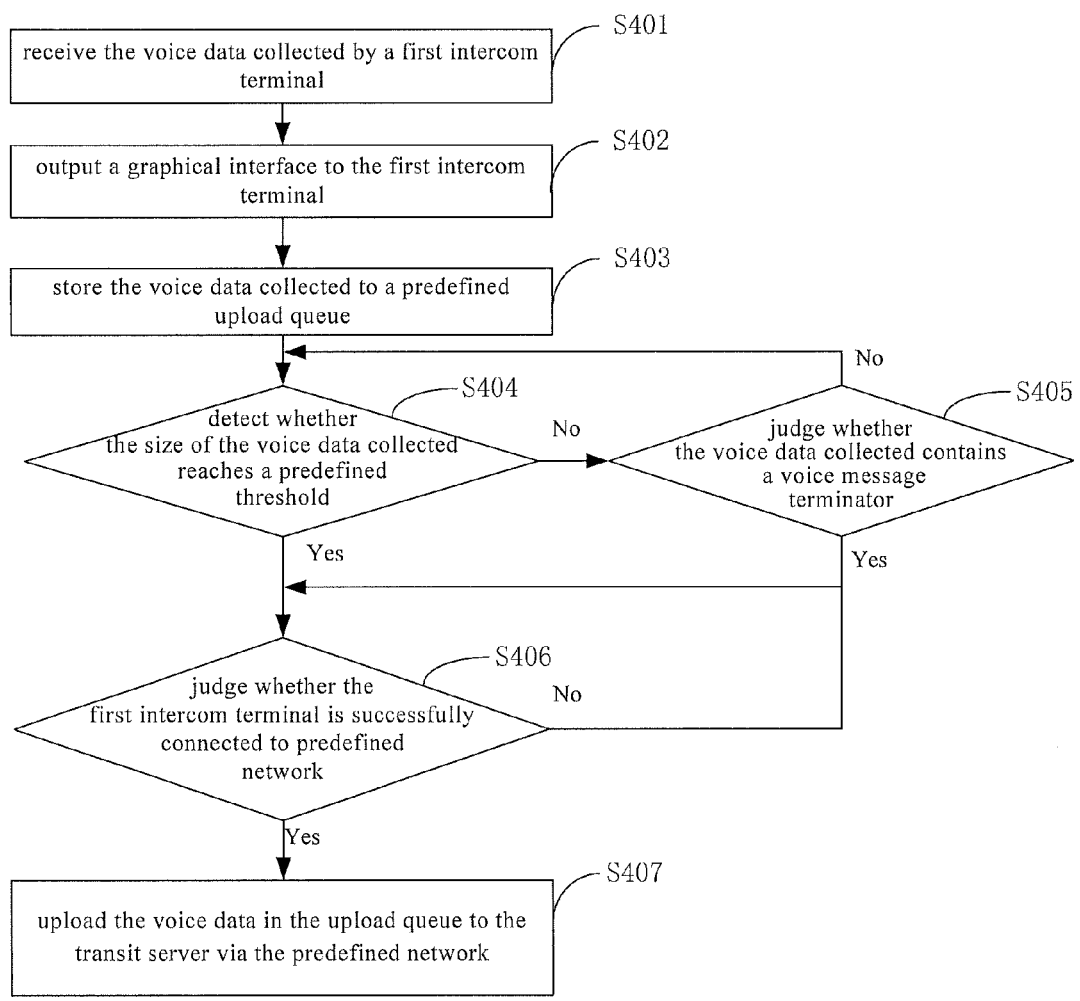
FIG. 4 is a flowchart of a method for transmitting voice messages according to embodiment 4 of the present disclosure.

FIG. 4 illustrates a flowchart of a method for transmitting voice messages according to embodiment 4 of the present disclosure. This embodiment is described in detail as below:

In step S401, receive the voice data collected by the first intercom terminal.

In step S402, timely output a graphical interface to the first intercom terminal and the graphical interface contains the sound volume information corresponding to the voice data collected.

Figure 5:
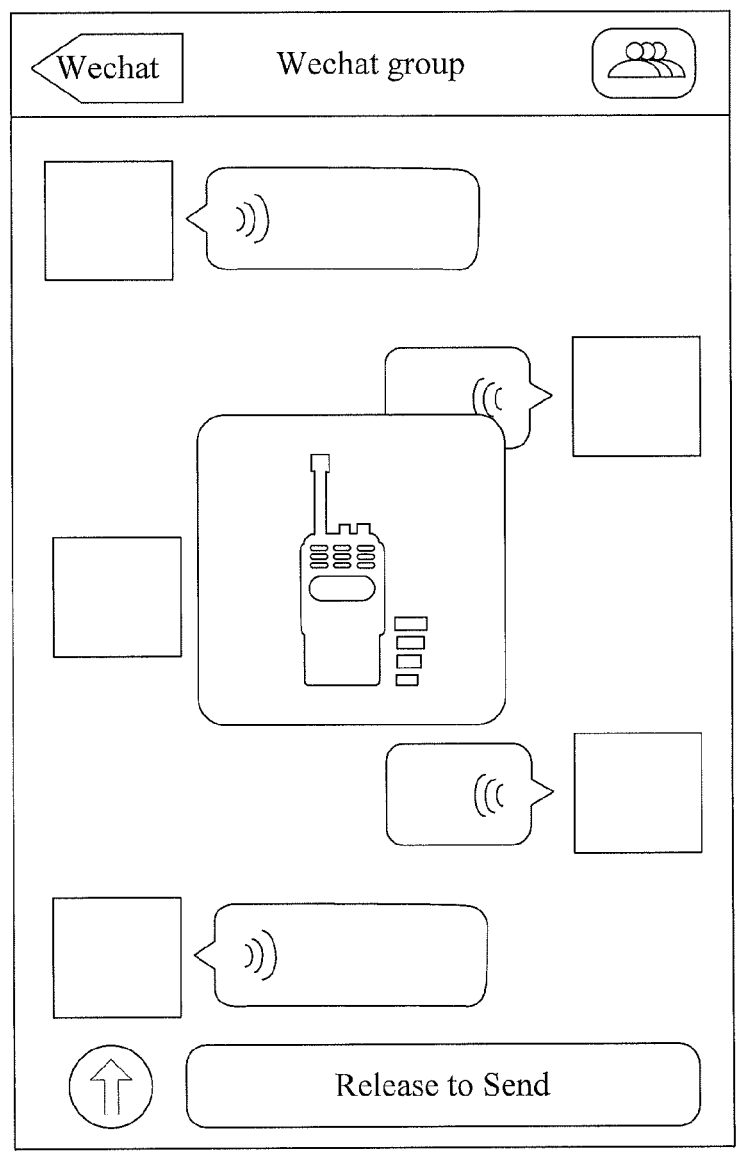
FIG. 5 is a schematic diagram illustrating a graphical interface output by the voice message transmission method according to embodiment 4 of the present disclosure.

In this embodiment of the present disclosure, while collecting the voice data of the first intercom terminal, namely, when the user is speaking, a graphical interface to the first intercom terminal is timely output. This graphical interface contains the sound volume information corresponding to the voice data collected, clearly indicating to the user the loudness of his voice. As an example, FIG. 5 illustrates the schematic view of the graphical interface output by the voice message transmission method according to embodiment 4 of the present disclosure. As shown in FIG. 5, the output graphical interface includes a walkie talkie image and a sound volume image, improving the visualization effect of the intercom terminal.

In step S403, store the voice data collected to a predefined upload queue.

Preferably, in this embodiment of the present disclosure, an upload queue is predefined, for caching the voice data collected to be uploaded to the transit server.

In step S404, detect whether the size of the voice data collected reaches a predefined threshold, and if yes, go to step S406, or if not, go to step S405.

In this embodiment of the present disclosure, the size of the upload queue in step S403 may be set to an integral multiple of the predefined threshold, for conveniently storing the voice data collected. When the size of the voice data collected reaches the predefined threshold or when the voice data collected doesn't reach the predefined size but contains a voice message terminator, the voice data collected will be uploaded to the transit server via the predefined network. In case the size of the voice data collected reaches the predefined threshold but the voice data can't be sent out in a timely manner, it can be cached in the upload queue, so as to avoid the loss of voice data.

In step S405, judge whether the voice data collected contains a voice message terminator, and if yes, go to step S406, or if not, go to step S404.

In step S406, judge whether the first intercom terminal is successfully connected to predefined network. If yes, go to step S407; if, not, continue step S406.

In step S407, after the first intercom terminal is successfully connected to the predefined network, upload the voice data in the upload queue to the transit server via the predefined network.

In this embodiment of the present disclosure, if the user collects the voice data through making a recording with the first intercom terminal not connected to the network, the voice data collected is cached in the upload queue. At the same time, the first intercom terminal continuously tries to connect to the predefined network. Once it is successfully connected to the network, the voice data collected will be uploaded to the transit server via the network. In this way, the automatic uploading of voice data without the need of manual intervention can be realized provided that the first intercom terminal is online, making the intercom terminal more intelligent.

Those skilled in the art can understand that all or part of the steps to realize the method described in the embodiment above can be accomplished through programs that instruct relevant hardware, wherein the programs may be stored in a computer readable storage medium, and the storage medium may be a magnetic disk, an optical disk, a Read Only Memory (ROM), or a Random Access Memory (RAM).

Embodiment 5

Figure 6:
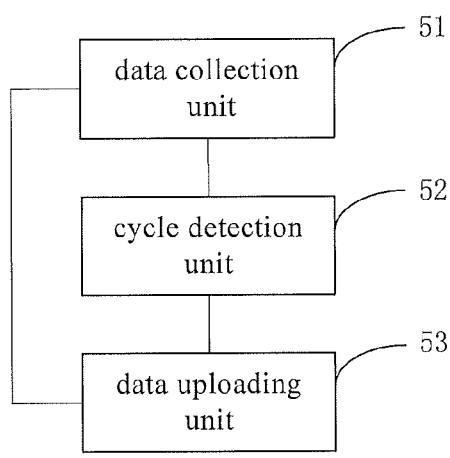
FIG. 6 is a structural diagram illustrating a system for transmitting voice messages according to embodiment 5 of the present disclosure.

FIG. 6 illustrates a structure of a system for transmitting voice messages according to embodiment 5 of the present disclosure. For ease of presentation, only parts in relation to the present embodiment of the disclosure are illustrated, including:

A data collection unit 51, configured to receive voice data collected by a first intercom terminal.

A cycle detection unit 52, configured to circularly detect whether the size of the voice data collected reaches a predefined threshold.

A data uploading unit 53, configured to upload the voice data collected to a transit server via a predefined network when the size of the voice data collected reaches the predefined threshold or when the voice data collected doesn't reach the predefined size but contains a voice message terminator.

In this embodiment of the present disclosure, the system for transmitting voice message can be implemented using the method described in embodiment 1. Please refer to the description of embodiment 1.

Embodiment 6

Figure 7:
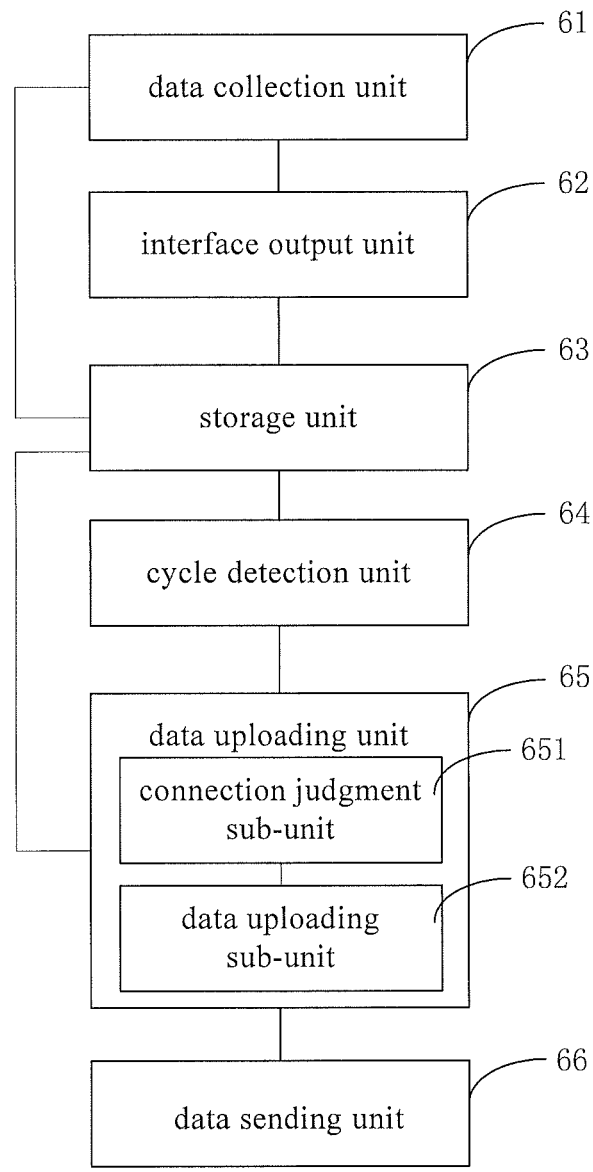
FIG. 7 is a structural diagram illustrating a system for transmitting voice messages according to embodiment 6 of the present disclosure.

FIG. 7 illustrates a structure of a system for transmitting voice messages according to embodiment 6 of the present disclosure. For ease of presentation, only parts in relation to the present embodiment of the disclosure are illustrated, including:

A data collection unit 61, configured to receive voice data collected by a first intercom terminal.

An interface output unit 62, configured to timely output a graphical interface to the first intercom terminal, wherein the graphical interface contains sound volume information corresponding to the voice data collected.

A storage unit 63, configured to store the voice data collected to a predefined upload queue.

A cycle detection unit 64, configured to circularly detect whether the size of the voice data collected reaches a predefined threshold.

A data uploading unit 65, configured to upload the voice data collected to the transit server via the predefined network when the size of the voice data collected reaches the predefined threshold or when the voice data collected doesn't reach the predefined size but contains a voice message terminator.

A data sending unit 66, configured to control the transit server to send the voice data collected to the second intercom terminal.

In this embodiment of the present disclosure, if the user collects the voice data by making a recording with the first intercom terminal not connected to the network, the voice data collected is cached in the upload queue. At the same time, the first intercom terminal continuously tries to connect to the predefined network. Once it is successfully connected to the network, the voice data collected will be uploaded to the transit server via the network. In this way, the automatic uploading of the voice data without the need of manual intervention can be realized provided that the first intercom terminal is online, making the intercom terminal more intelligent. To this end, the data uploading unit 65 may further include a connection judgment sub-unit 651 and a data uploading sub-unit 652, wherein:

The connection judgment sub-unit 651 is configured to circularly judge whether the first intercom terminal is successfully connected to the predefined network; and The data uploading sub-unit 652 is configured to upload voice data in the upload queue to the transit server via the predefined network once the first intercom terminal is successfully connected to the predefined network.

The present embodiment of the disclosure has realized the asynchronization between the collection of voice data by the first intercom terminal and the uploading of the voice data collected of a predefined size to the transit server. Therefore, the problem of time consuming during the traditional voice message transmission is solved, reduced the intercom delay is reduced and the personalization of intercom is improved through receiving the voice data collected by the first intercom terminal, circularly detecting whether the size of the voice data collected reaches the predefined threshold and then uploading the voice data collected to the transit server via the predefined network when the size of the voice data collected reaches the predefined threshold or when the voice data collected doesn't reach the predefined size but contains a voice message terminator. In case the intercom terminal is not connected to the predefined network, the voice data collected will be cached in the upload queue, and at the same time, the first intercom terminal continuously tries to connect to the predefined network. Once it is successfully connected to the network, the voice data collected will be uploaded to the transit server via the network. In this way, the automatic uploading of voice data without the need of manual intervention can be realized provided that the first intercom terminal is online, making the intercom terminal more intelligent.

Person skilled in the art can understand that all or part of the steps to realize the method described in the embodiment above can be accomplished through programs that instruct relevant hardware, wherein the programs may be stored in a computer readable storage medium, and the storage medium may be a magnetic disk, an optical disk, a Read Only Memory (ROM), or a Random Access Memory (RAM).

The present disclosure also provides a computing device for transmitting voice messages. The computing device includes at least one processor; a memory; and one or more programs stored in the memory and to be executed by the at least one processor, the one or more programs comprise instructions to:

receive voice data collected by a first intercom terminal;

detect whether the size of the voice data collected reaches a predefined threshold; and upload the voice data collected to a transit server via a predefined network when the size of the voice data collected reaches the predefined threshold, or when the voice data collected contains a voice message terminator.

The one or more programs may further include instructions to: control the transit server to send the voice data collected to a second intercom terminal after uploading the voice data collected to the transit server via the predefined network.

The one or more programs may also include instructions to: store the voice data collected to a predefined upload queue after receiving the voice data collected by the first intercom terminal and before detecting circularly whether the size of the voice data collected reaches the predefined threshold.

Further, as described above, the one or more programs may further include instructions to: output a graphical interface to the first intercom terminal after receiving the voice data collected by the first intercom terminal; wherein the graphical interface contains sound volume information corresponding to the voice data collected.

The preferred embodiments described above are all exemplary in nature only and should not be construed as restrictions to the present disclosure in any way.

Any modifications, variations, equivalent replacements and improvements which are apparent to those skilled in the art without departing from the scope and spirit of the present disclosure are intended to be within the scope of the following claims.

What is claimed is:

1. A method for transmitting voice messages, comprising:
receiving voice data collected by a first intercom terminal;
detecting whether the size of the voice data collected reaches a predefined threshold; and
uploading the voice data collected to a transit server via a predefined network when the size of the voice data collected reaches the predefined threshold, or when the voice data collected contains a voice message terminator;

wherein the method further comprises
storing the voice data collected to a predefined upload queue after receiving the voice data collected by the first intercom terminal and before detecting circularly whether the size of the voice data collected reaches the predefined threshold;
wherein uploading the voice data collected to the transit server via the predefined network comprises:
detect circularly whether the first intercom terminal is connected to the predefined network successfully; and
uploading the voice data in the upload queue to the transit server via the predefined network when the first intercom terminal is successfully connected to the predefined network.

2. The method according to claim 1, further comprising:
controlling the transit server to send the voice data collected to a second intercom terminal after uploading the voice data collected to the transit server via the predefined network.

3. The method according to claim 1, wherein the first intercom terminal is a mobile terminal, and the predefined network is either a GPRS network or a WiFi network.

4. The method according to claim 1, further comprising:
outputting a graphical interface to the first intercom terminal after receiving the voice data collected by the first intercom terminal; wherein the graphical interface contains sound volume information corresponding to the voice data collected.

5. A system for transmitting voice messages, comprising:
a data collection unit, configured to receive voice data collected by a first intercom terminal;
a cycle detection unit, configured to detect whether the size of the voice data collected reaches a predefined threshold; and
a data uploading unit, configured to upload the voice data collected to a transit server via a predefined network when the size of the voice data collected reaches the predefined threshold, or when the voice data collected contains a voice message terminator;
wherein the system further comprises a storage unit, configured to store the voice data collected to a predefined upload queue; and
wherein the data uploading unit comprises:
a connection judgment sub-unit, configured to judge circularly whether the first intercom terminal is successfully connected to the predefined network; and
a data upload sub-unit, configured to upload the voice data in the upload queue to the transit server via the predefined network when the first intercom terminal is successfully connected to the predefined network.

6. The system according to claim 5, further comprising:
a data sending unit, configured to control the transit server to send the voice data collected a second intercom terminal.

7. The system according to claim 5, further comprising:
an interface output unit, configured to output a graphical interface to the first intercom terminal, wherein the graphical interface contains sound volume information corresponding to the voice data collected.

8. A non-transitory computer storage medium comprising a set of instructions for transmitting voice messages, the set of instructions to direct at least one processor to perform acts of:
receiving voice data collected by a first intercom terminal;
detecting whether the size of the voice data collected reaches a predefined threshold; and
uploading the voice data collected to a transit server via a predefined network when the size of the voice data collected reaches the predefined threshold, or when the voice data collected contains a voice message terminator;
wherein the set of instructions further to direct at least one processor to perform acts of:
storing the voice data collected to a predefined upload queue after receiving the voice data collected by the first intercom terminal and before detecting circularly whether the size of the voice data collected reaches the predefined threshold;
detecting circularly whether the first intercom terminal is connected to the predefined network successfully; and
uploading the voice data in the upload queue to the transit server via the predefined network when the first intercom terminal is successfully connected to the predefined network.

9. The non-transitory computer storage medium according to claim 8, wherein the set of instructions further to direct at least one processor to perform acts of:
controlling the transit server to send the voice data collected to a second intercom terminal after uploading the voice data collected to the transit server via the predefined network.

10. The non-transitory computer storage medium according to claim 8, wherein the set of instructions further to direct at least one processor to perform acts of:
outputting a graphical interface to the first intercom terminal after receiving the voice data collected by the first intercom terminal; wherein the graphical interface contains sound volume information corresponding to the voice data collected.

11. A computing device for transmitting voice messages, comprising:
at least one processor;
a memory; and
one or more programs stored in the memory and to be executed by the at least one processor, the one or more programs comprise instructions to:
receive voice data collected by a first intercom terminal;
detect whether the size of the voice data collected reaches a predefined threshold; and
upload the voice data collected to a transit server via a predefined network when the size of the voice data collected reaches the predefined threshold, or when the voice data collected contains a voice message terminator;
wherein the one or more programs further comprises instructions to:
store the voice data collected to a predefined upload queue after receiving the voice data collected by the first intercom terminal and before detecting circularly whether the size of the voice data collected reaches the predefined threshold;
detecting circularly whether the first intercom terminal is connected to the predefined network successfully; and
uploading the voice data in the upload queue to the transit server via the predefined network when the first intercom terminal is successfully connected to the predefined network.

12. The computing device according to claim 11, wherein the one or more programs further comprises instructions to:
control the transit server to send the voice data collected to a second intercom terminal after uploading the voice data collected to the transit server via the predefined network.

13. The computing device according to claim 11, wherein the one or more programs further comprises instructions to:

output a graphical interface to the first intercom terminal after receiving the voice data collected by the first intercom terminal; wherein the graphical interface contains sound volume information corresponding to the voice data collected.

* * * * *